United States Patent [19]
Ito et al.

[11] Patent Number: 5,473,749
[45] Date of Patent: Dec. 5, 1995

[54] IMAGE PROCESSING SYSTEM HAVING PLURALITY OF PROCESSORS ACTING ON IMAGE DATA ACCORDING TO STORED PROGRAM FROM HOST COMPUTER

[75] Inventors: Norikazu Ito; Hiroyuki Fujita; Atsushi Hasebe; Ryouhei Kato; Masahiro Kato, all of Kanagawa, Japan

[73] Assignee: Sony Corporation, Tokyo, Japan

[21] Appl. No.: 389,568

[22] Filed: Feb. 16, 1995

Related U.S. Application Data

[63] Continuation of Ser. No. 976,449, Nov. 13, 1992, abandoned.

[30] Foreign Application Priority Data

| Nov. 21, 1991 | [JP] | Japan | 3-306253 |
| Nov. 22, 1991 | [JP] | Japan | 3-307972 |
| Nov. 28, 1991 | [JP] | Japan | 3-314343 |

[51] Int. Cl.$^6$ ............................................. G06F 15/00
[52] U.S. Cl. ........................................ 395/162; 395/164
[58] Field of Search ................................ 395/162–166, 395/625, 650, 284

[56] References Cited

U.S. PATENT DOCUMENTS 5,278,948  1/1994  Luken, Jr. ............................. 395/163

FOREIGN PATENT DOCUMENTS 0147857  7/1985  European Pat. Off. ........ G06F 15/62

OTHER PUBLICATIONS

Elektronik vol. 37, No. 3, Feb. 1985, Munchen de pp. 39–43 A. Zoicas 'Datenjestenerter Prozezsor beschlennight die Bildverarbeitung'.

Proceedings Of The 1985 International Conference On Parallel Processing 20 Aug. 1985, pp. 493–497 R. M. Logheed et al. 'Multi–Processor Architectures for Machine Vision and Image Analysis'.

Compcon 84 Fall Proceedings 16 Sep. 1984, Arlington, Va. pp. 245–254 T. Temma et al. 'chip Oriented Data–Flow Image Processor: TIP-3'.

*Primary Examiner*—Mark R. Powell
*Assistant Examiner*—Kee M. Tung
*Attorney, Agent, or Firm*—William S. Frommer; Alvin Sinderbrand

[57] ABSTRACT

In processing image data by a plurality of processors in accordance with processing information from a host computer, such processing information is stored in a program memory at an address indicated by the host computer and is read from the program memory and supplied to the processors. The processing information stored in the program memory is held therein until new processing information is supplied by the host computer and, in response to a read signal from the host computer, the processing information stored at a respective address in the program memory is supplied therefrom to the host computer which can confirm whether such information has been correctly transmitted to the processors.

7 Claims, 16 Drawing Sheets

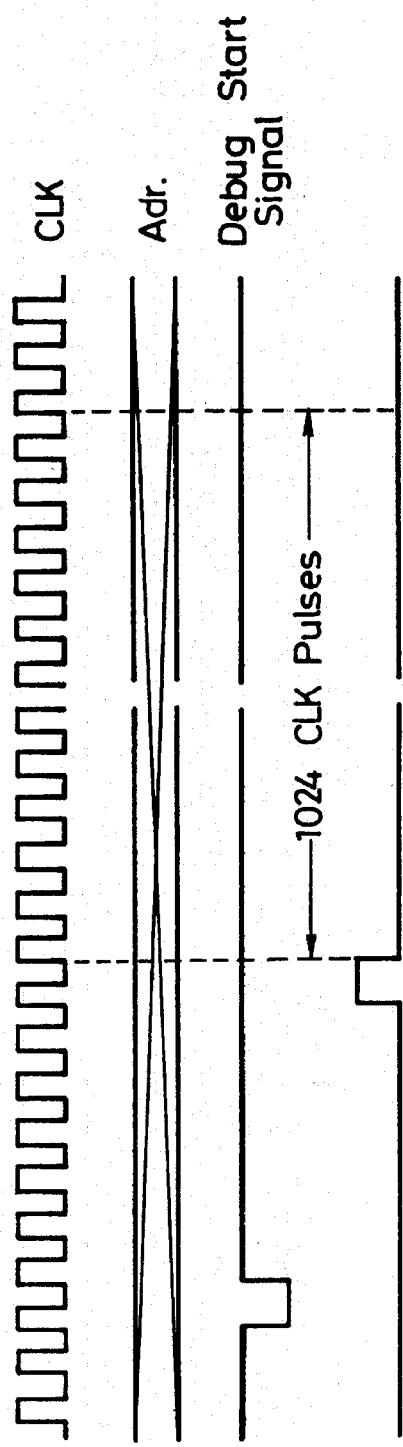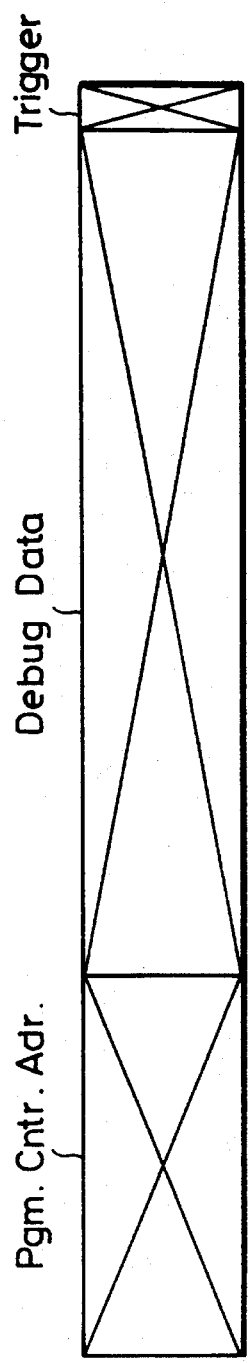
FIG. 16
FIG. 17

IMAGE PROCESSING SYSTEM HAVING PLURALITY OF PROCESSORS ACTING ON IMAGE DATA ACCORDING TO STORED PROGRAM FROM HOST COMPUTER

This application is a continuation Ser. No. 07/976,449, filed Nov. 13, 1992, and which has been abandoned as of the filing date of this application.

BACKGROUND OF THE INVENTION

1. Field of the Invention

The present invention relates to an image processing system which comprises a plurality of processors.

2. Description of the Prior Art

Heretofore, there has been known an image processing system comprising a plurality of processors as disclosed in UK Patent Application GB2213621A, for example. The conventional image processing system has suffered various drawbacks. When a large amount of data to be processed is supplied from a host computer to a processing unit composed of processors, the interpretation speed of the processing unit is so slow that the host computer is required to repeat the transmission of the same data or transmit data slowly over a long period of time, resulting in a timing-consuming data communication process.

After the host computer has transmitted data to the processing unit, the host computer is unable to recognize the transmitted data again. Though the host computer can recognize the transmitted data if it is stored in the host computer, the host computer is no longer able to recognize the stored data when it has any trouble which has modified the stored data.

In the image processing system, a processing program supplied from the host computer is delivered to the processors by a system control processor, and the processors process any input data signals according to the supplied program. Since the system control processor needs to be energized first immediately after the image processing system is switched on, the system control processor has a ROM as a program memory. If the processing program is complex and requires a lot of signal processing, then the system control processor necessarily has a large circuit scale as it requires a large-capacity ROM or a number of ROMs. A RAM may be used as a program memory and a processing program to be used by the system control processor may be loaded from the host computer into the RAM. However, the time to transfer the processing program from the host computer to the RAM is long, and hence the time consumed to process necessary input data is also long.

The image processing system with plural processors process input signals according to distributed or parallel processing. It is therefore difficult to locate a program bug based on the processed data. In the distributed image processing system, the processing program is divided into a plurality of programs which are supplied to the respective processors. The processors then process input signals according to the divided programs supplied respectively thereto. In the distributed processing, the processors process input signals in different manners, or the processors are divided into a plurality of groups which process input signals differently. In the parallel processing, the processors process different data according to the same signal processing sequence.

In the distributed or parallel image processing system, one job is divided into smaller jobs which are simultaneously processed by the respective processors, and the results of signal processing by the processors are combined into a final output signal. In the event of a program bug, therefore, it is difficult to find which smaller job is suffering the bug. As a consequence, a large-scale program cannot be developed with high efficiency.

OBJECTS AND SUMMARY OF THE INVENTION

It is a major object of the present invention to provide an image processing system which allows a host computer to easily recognize the content of information to be processed that has been supplied from the host computer.

Another object of the present invention is to provide an image processing system which is capable of transferring program data in a short period of time from a host computer.

Still another object of the present invention is to provide an image processing system which can easily recognize the processing conditions of respective processors that the image processing system is composed of.

According to the present invention, there is provided an image processing system comprising a processing unit for processing image data based on processing information supplied from a host computer, storage means for storing the processing information supplied from the host computer at an address indicated by the host computer, and control means for supplying the processing information read from the storage means to the processing unit, the storage means comprising means for holding the stored processing information until new processing information is supplied from the host computer, and supplying the processing information stored at the address to the host computer in response to a read signal supplied from the host computer.

According to the present invention, there is also provided an image processing system comprising a plurality of processors for processing image data based on a processing program supplied from a host computer, a program buffer memory for storing the processing program supplied from the host computer, a system control processor for supplying the processing program stored in the program buffer memory selectively to the processors, the system control processor having a program memory for storing an operation program for the system control processor, and a loader for loading the program memory with a program from the program buffer memory in response to an address signal and a transfer start signal which are supplied from the host computer, the system control processor having means for supplying the processing program stored in the program buffer memory selectively to the processors based on the program loaded in the program memory.

According to the present invention, there is further provided an image processing system comprising a plurality of processors for simultaneously processing image data based on processing information supplied from a host computer, means for producing final processed data representative of a combination of processed data from the processors, storage means for storing data indicative of the processed data from one of the processors which is indicated by a selection signal supplied from the host computer, and control means for reading the stored data from the storage means based on a read signal supplied from the host computer, and supplying the read data to the host computer.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 11 is a block diagram of an image processing system according to still another embodiment of the present invention;

FIG. 16 is a timing chart of an operation sequence of the debug address generator shown in FIG. 15;

FIG. 17 is a diagram of a debug data bit structure in the debug memory shown in FIG. 14.

DETAILED DESCRIPTION OF THE PREFERRED EMBODIMENTS

Figure 1:
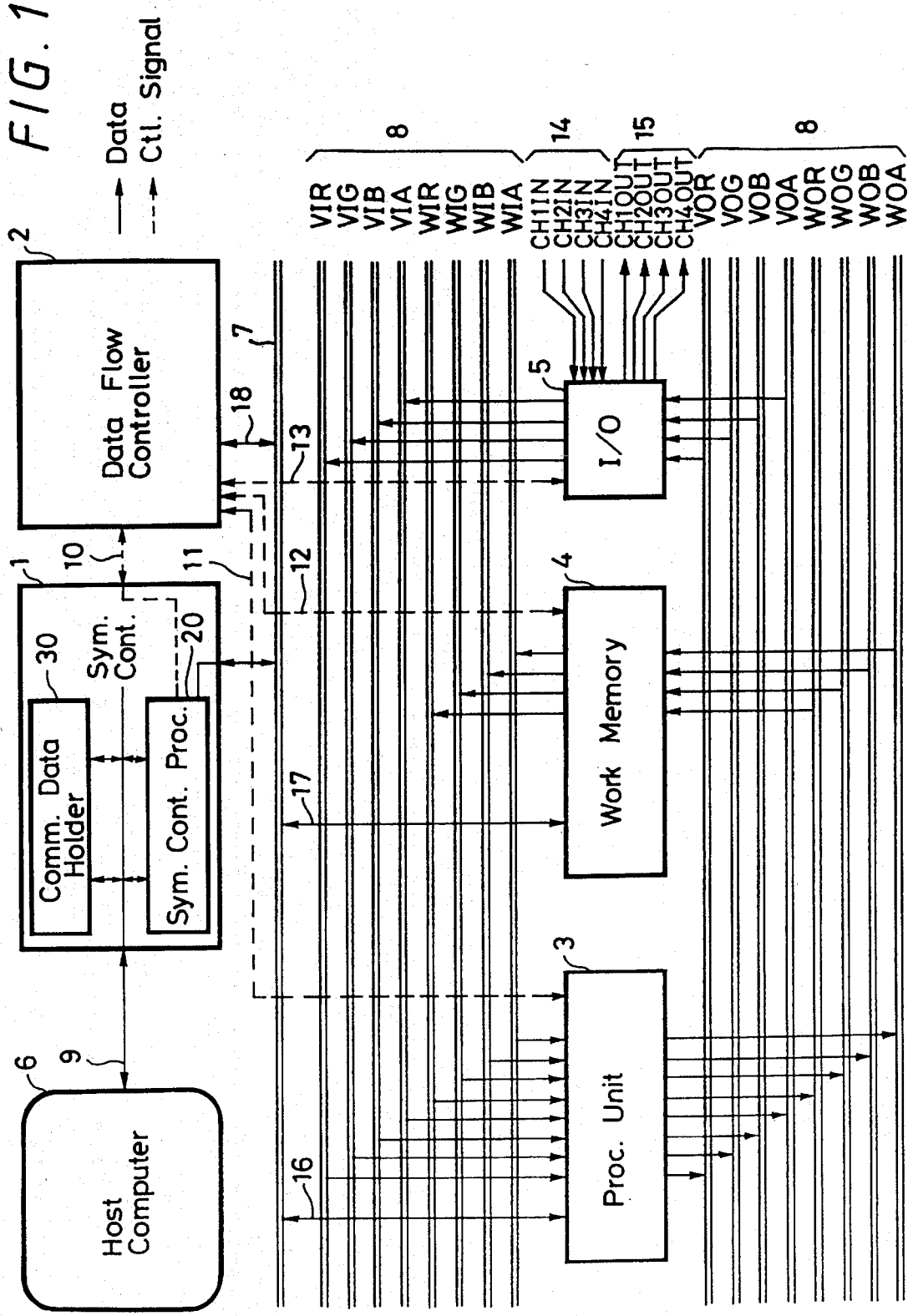
FIG. 1 is a block diagram of an image processing system according to an embodiment of the present invention.

As shown in FIG. 1, an image processing system embodying the present invention generally comprises a system controller 1, a data flow controller 2, a processing unit 3, a work memory 4, and an input/output device 5. The system controller 1 has a system control processor 20 for controlling the processing unit 3, the memory 4, etc., and supervising data transfer over buses, and a communication data holder 30. The data flow controller 2 controls the flow of data from a data bus 8 to the processing unit 3 and the work memory 4, and also the flow of data from the processing unit 3 and the work memory 4 to the data bus 8. The processing unit 3 processes input data supplied thereto. The work memory 4 temporarily stores data being processed, and also stores data required by the processing unit 3 when it processes data. The input/output device 5 outputs the data processed by the processing unit 3 to an external device, and also supplies input data from an external source to the data bus 8.

A host computer 6 is connected to the system controller 1 through a system bus 9 such as a VME bus, and is used to control the operation of the image processing system and as a program development environment. A program supplied from the host computer 6 is written into a program buffer memory (not shown) in the system controller 1. When the program is read from the program buffer memory, it is loaded through a memory bus 7 into the data flow controller 2 and the processing unit 3. The host computer 1 also accesses the work memory 4. In FIG. 1, broken lines represent control lines, and solid lines represent data lines.

The processing unit 3 comprises a number of processors, e.g., 72 processors. The work memory 4 comprises a memory and an address generator, and may be used as a one-dimensional or a multidimensional memory depending on address bit allocation. The input/output device 5 comprises a double-buffer memory for transferring data at high rate. When synchronized by an external device, the input/output device 5 can transfer data at the data rate of external device which is connected to the input/output device 5 by input and output data buses 14, 15.

The data bus 8 comprises, for example, 16 independent bus lines VIR, VIG, VIB, VIA, WIR, WIG, WIB, WIA, VOR, VOG, VOB, VOA, WOR, WOG, WOB, WOA. The eight bus lines VIR, VIG, VIB, VIA, WIR, WIG, WIB, WIA serve to supply input data, e.g., three primary signals R, G, B and an audio signal, to the processing unit 3. The other eight bus lines VOR, VOG, VOB, VOA, WOR, WOG, WOB, WOA are supplied with output data, e.g., processed three primary signals R, G, B and an audio signal, from the processing unit 3. The bus lines WIR, WIG, WIB, WIA, WOR, WOG, WOB, WOA are connected to the work memory 4, and the other bus lines VIR, VIG, VIB, VIA, VOR, VOG, VOB, VOA are connected to the input/output device 5. The bus lines connected to the work memory 4 and the input/output device 5 are oriented in the direction opposite to the direction in which the bus lines are connected to the processing unit 3.

The communication data holder 30, which serves to hold data from the host computer 6, and communication data such as data and flags indicative of the execution status in the processing unit 3, will be described below with reference to FIG. 2.

The communication data holder 30 comprises a plurality of registers for holding several types of data. These registers include control registers CR1, CR2, CR3 for holding data from the host computer 6, and status registers SR1, SR2 for holding data supplied from the processing unit 3. The data stored in the status registers SR1, SR2 can be read from the host computer 6. The data stored in the control registers CR1, CR2, CR3 can also be read from the host computer 6.

Figure 2:
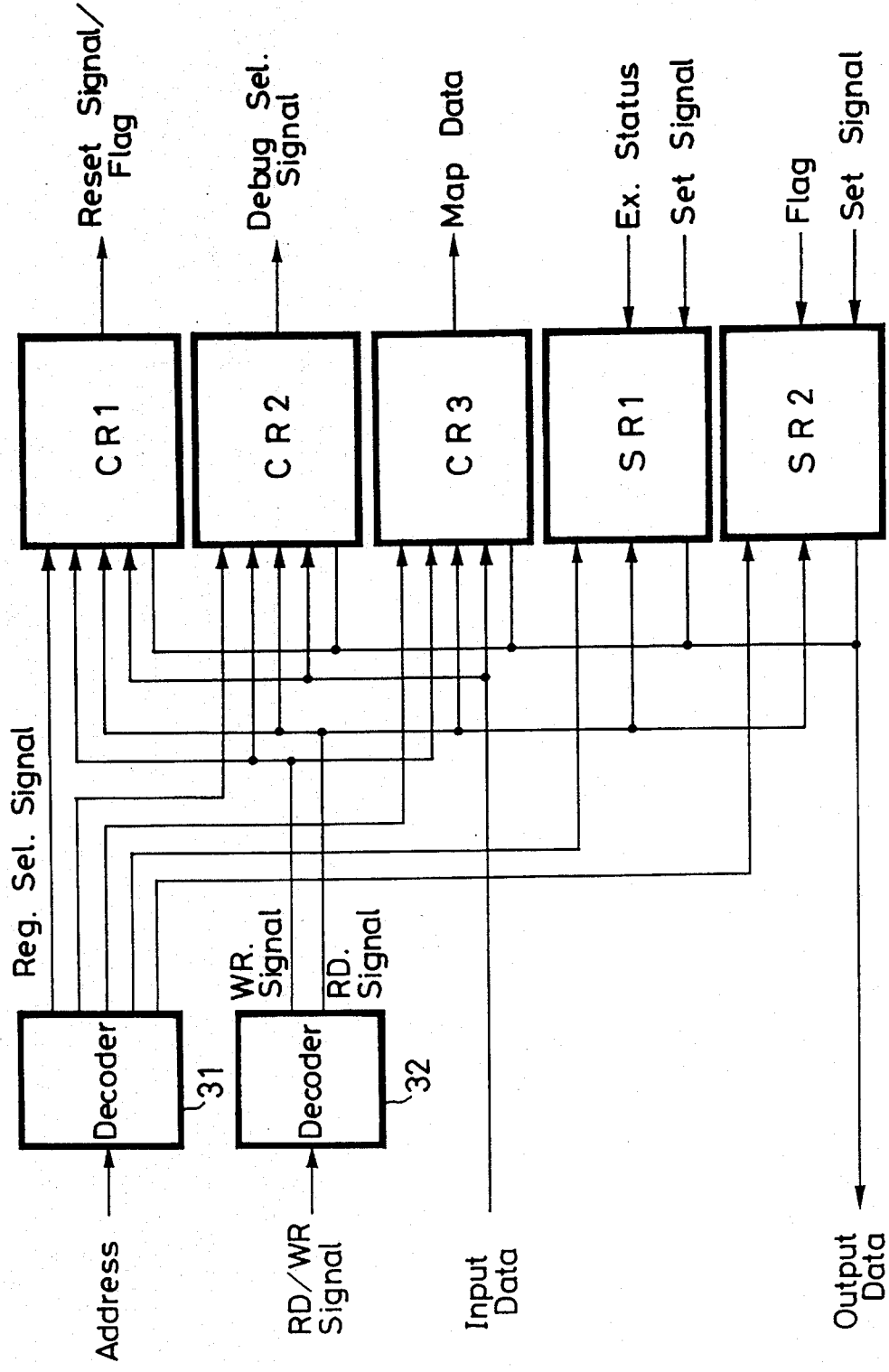
FIG. 2 is a block diagram of a communication data holder in the image processing system shown in FIG. 1.

In FIG. 2, an address signal and a read/write signal supplied from the host computer 6 are applied respectively to decoders 31, 32. Based on the address signal, the decoder 31 generates a register selection signal for selected a desired one of the registers CR1, CR2, CR3, SR1, SR2. Based on the read/write signal, the decoder 32 generates a write signal and a read signal. The write signal is supplied to the control registers CR1, CR2, CR3, and the read signal is supplied to the control and status registers CR1, CR2, CR3, SR1, SR2.

Input data supplied from the host computer 6 is supplied to the control registers CR1, CR2, CR3, and stored in one of the control registers CR1, CR2, CR3 depending on the register selection signal and the write signal. The data stored in the control registers CR1, CR2, CR3 is held until new data is supplied and set therein. The data stored in the control registers CR1, CR2, CR3 includes, for example, a flag for indicating the start and end of various executions and timing the transfer of data between some or all processors of the processing unit 3, a debug selection signal for indicating a processor for which debug data is requested and a certain location in the processor, and starting a debug counter, and map data to be set in a map register in the system control processor 20.

Data indicative of execution statuses and a flag supplied from the processing unit 3 are stored in one of the status registers SR1, SR2 depending on a set signal supplied from the processing unit 3. The data stored in the status registers SR1, SR2 is read by the register selection signal and the read signal which are supplied from the decoders 31, 32, respectively, and supplied to the host computer 6. The data stored in the status registers SR1, SR2 is held until new data is supplied and set therein.

The data stored in the control registers CR1, CR2, CR3 is also read by the register selection signal and the read signal which are supplied from the decoders 31, 32, respectively, and supplied to the host computer 6.

Figure 3:
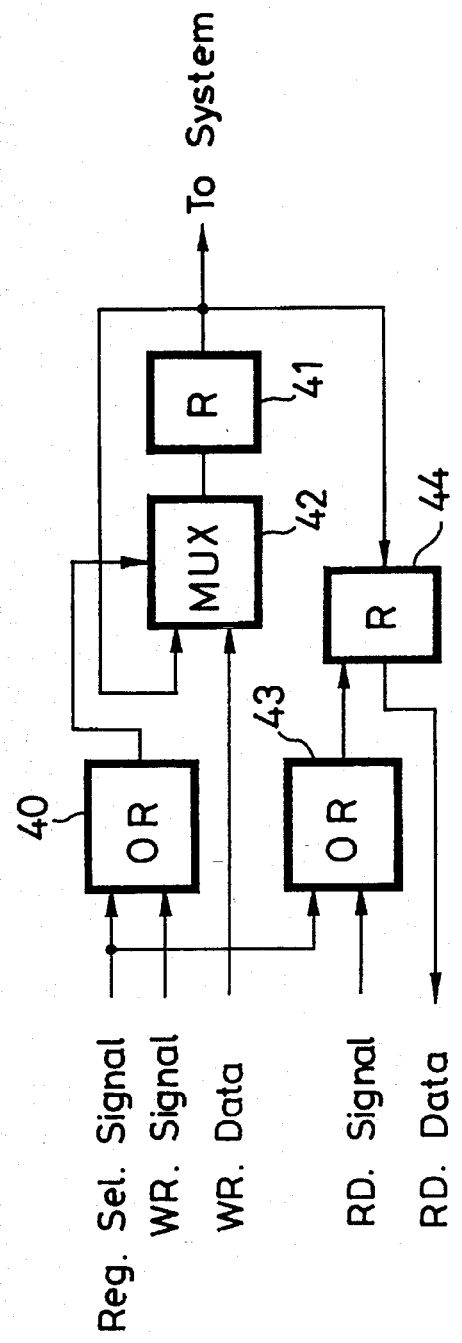
FIG. 3 is a block diagram of a control register in the image processing system shown in FIG. 1.

Each of the control registers CR1, CR2, CR3 will be described below with reference to FIG. 3.

The register selection signal and the write signal supplied from the decoders 31, 32 are supplied to an OR gate 40 whose output signal is supplied to a selector 42 that selectively outputs an output signal from a holding register 41 and write data supplied from the host computer 6. The register selection signal and the read signal supplied from the decoders 31, 32 are supplied to an OR gate 43 whose output signal is supplied as an output control signal to a register 44 which selectively supplies the output signal from the holding register 41 to the host computer 6. The output signal from the holding register 41 is supplied as an output signal from the control registers CR1, CR2, CR3 to the processing unit 3, etc.

Figure 4:
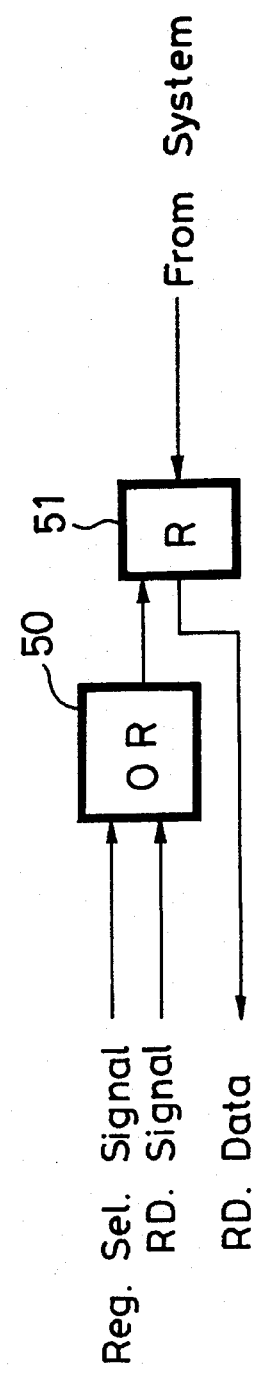
FIG. 4 is a block diagram of a status register in the image processing system shown in FIG. 1.

Each of the status registers SR1, SR2 will be described below with reference to FIG. 4.

The register selection signal and the write signal supplied from the decoders 31, 32 are supplied to an OR gate 50 whose output signal is supplied as a storage control signal to a register 51 which stores data supplied from the processing unit 3. An output signal from the register 51 is supplied as an output signal from the status registers SR1, SR2 to the host computer 6.

Data from the host computer 6 is set in the communication data holder 30 as follows:

The host computer 6 supplies an address signal to the decoder 31 to select a desired one of the control registers CR1, CR2, CR3. For example, the host computer 6 supplies an address signal indicative of an address 00 in order to select the control register CR1, an address signal indicative of an address 01 in order to select the control register CR2, and an address signal indicative of an address 02 in order to select the control register CR3. Then, the decoder 31 makes low the level of a register selection signal supplied to the control register that is indicated by the supplied address. The host computer 6 also supplies the decoder 32 with 10, for example, as a read/write signal, whereupon the decoder 32 outputs a write signal which is low in level. The control register which is selected by the register selection signal from the decoder 31 stores data from the host computer 6 in response to the write signal from the decoder 32.

The data newly set in the control register is supplied to the computer unit 3.

Data from the computing unit 3 is set in the status registers SR1, SR2 as follows:

Data and a flag indicative of an execution status, supplied from the processing unit 3 are stored in the status registers SR1, SR2 in response to a set signal from the processing unit 3. The data stored in the status registers SR1, SR2 is not supplied to the host computer 6 unless a read signal is supplied from the host computer 6.

The data stored in the control registers CR1, CR2, CR3 and the status registers SR1, SR2 can selectively be supplied to the host computer 6 in response to an address signal and a read/write signal which are supplied from the host computer 6.

Figure 5:
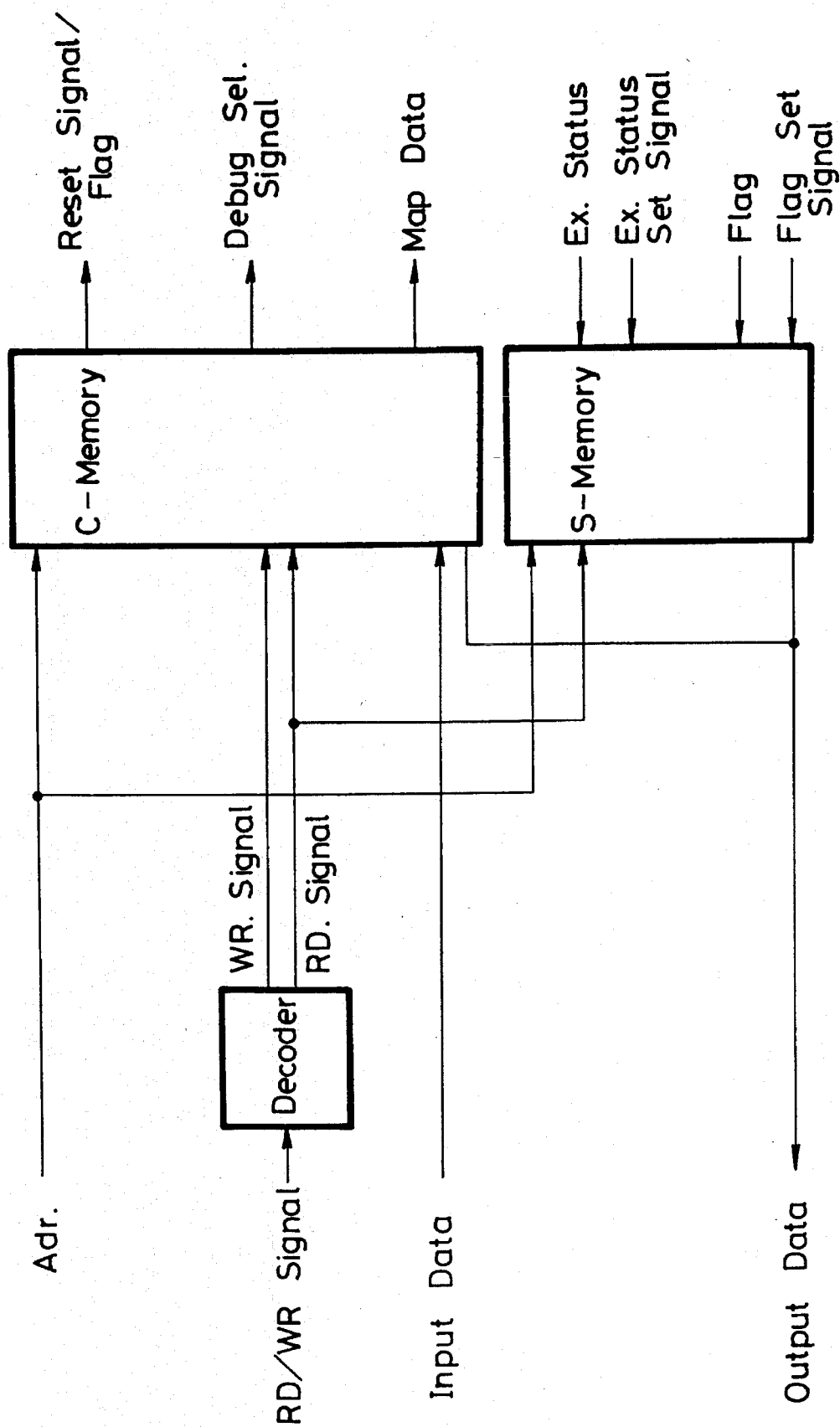
FIG. 5 is a block diagram of a modified communication data holder that may be used in the image processing system shown in FIG. 1.

FIG. 5 shows a modified communication data holder which may be used in place of the communication data holder 30 shown in FIGS. 1 and 2. In FIG. 5, the modified communication data holder comprises 2-port memories including a control memory (C-Memory) corresponding to the control registers CR1, CR2, CR2 shown in FIG. 2 and a status memory (S-Memory) corresponding to the status registers SR1, SR2 shown in FIG. 2. The modified communication data holder shown in FIG. 5 has no address decoder.

In the image processing system shown in FIG. 1, communication data between the host computer 6 and the processing unit 3 is held for a certain period of time by the communication data holder 30. Therefore, the burden imposed on the host computer 6 in the transfer of communication data is reduced. The communication data holder 30 in the image processing system is particularly advantageous for the transfer of status data.

In addition, the communication data that has been transferred from the host computer 6 to the image processing system can be read from the communication data holder 30 by the host computer 6. Therefore, the host computer 6 can confirm whether data has been properly transmitted from the host computer 6 to the image processing system. It is not necessary for the host computer 6 to store communication data which has been transferred in a previous cycle.

FIGS. 6 through 11 show an image processing system according to another embodiment of the present invention. Those parts shown in FIGS. 6 through 11 which are identical to those shown in FIGS. 1 through 5 are denoted by identical reference numerals, and will not be described in detail below.

Figure 6:
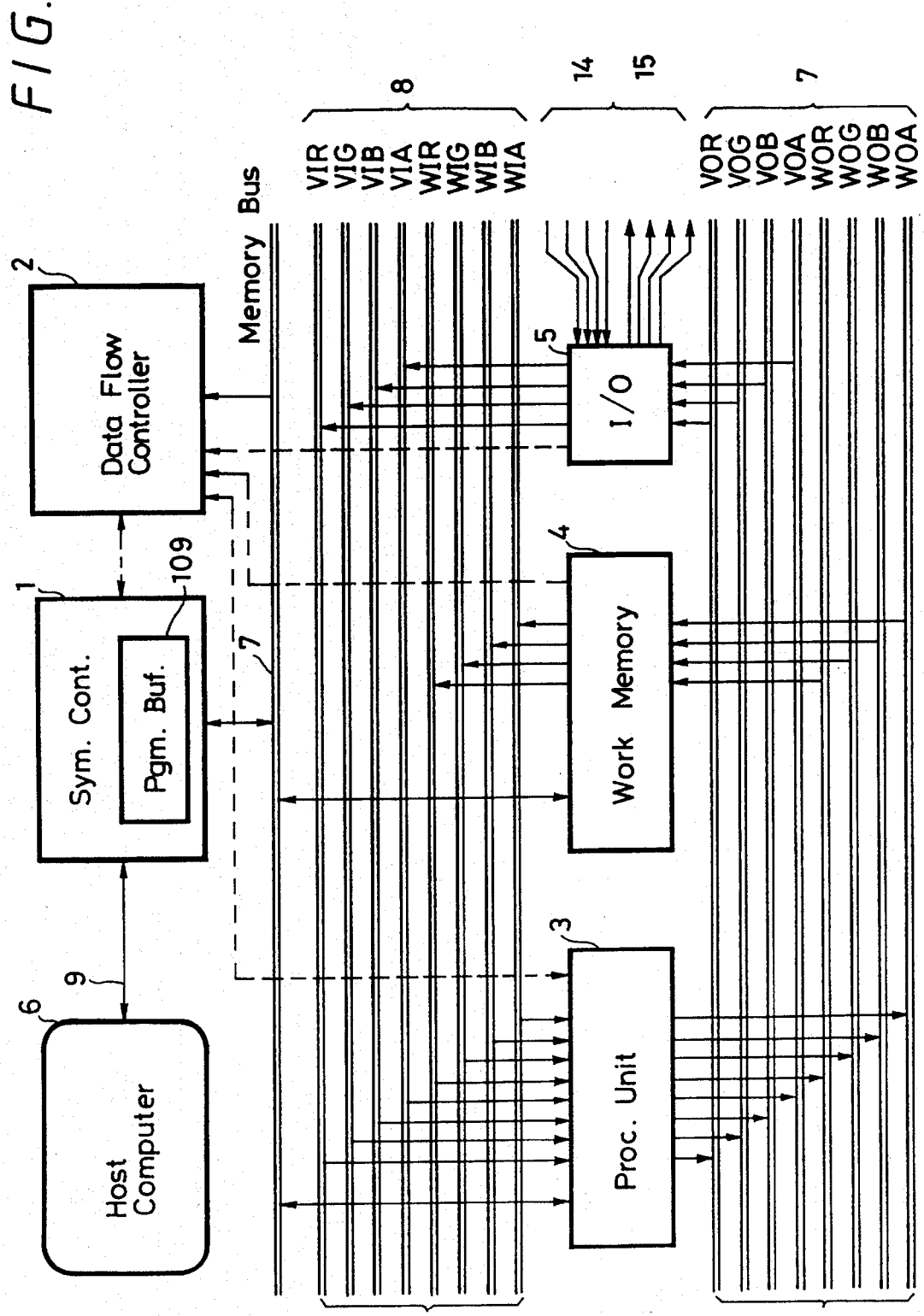
FIG. 6 is a block diagram of an image processing system according to another embodiment of the present invention.

As shown in FIG. 6, the image processing system comprises a system controller 1, a data flow controller 2, a processing unit 3, a work memory 4, an input/output device 5, a memory bus 7, a data bus 8, and input and output data buses 14, 15. A host computer 6 is connected to the system controller 1 through a system bus 9 such as a VME bus, and is used to control the operation of the image processing system and as a program development environment. In FIG. 6, broken lines represent control lines, and solid lines represent data lines.

Communications are carried out and data is transferred between the system controller 1 and the host computer 6. The system controller 1 supervises the memory bus 7. A program supplied from the host computer 6 is written into a program buffer memory 109 in the system controller 1, and the program read from the program buffer memory 109 is loaded into the data flow controller 2 and the processing unit 3 through the memory bus 7. The host computer 6 also accesses the work memory 4.

Communications are also effected between the system controller 1 and the data flow controller 2, with the processing in the data flow controller 2 being supervised. The data flow controller 2 controls communications with the processors of the processing unit 3 and data transfer between the processors and the data bus 8. The data flow controller 2 also controls the generation of memory addresses for the work memory 4 and the input/output device 5.

Figure 7:
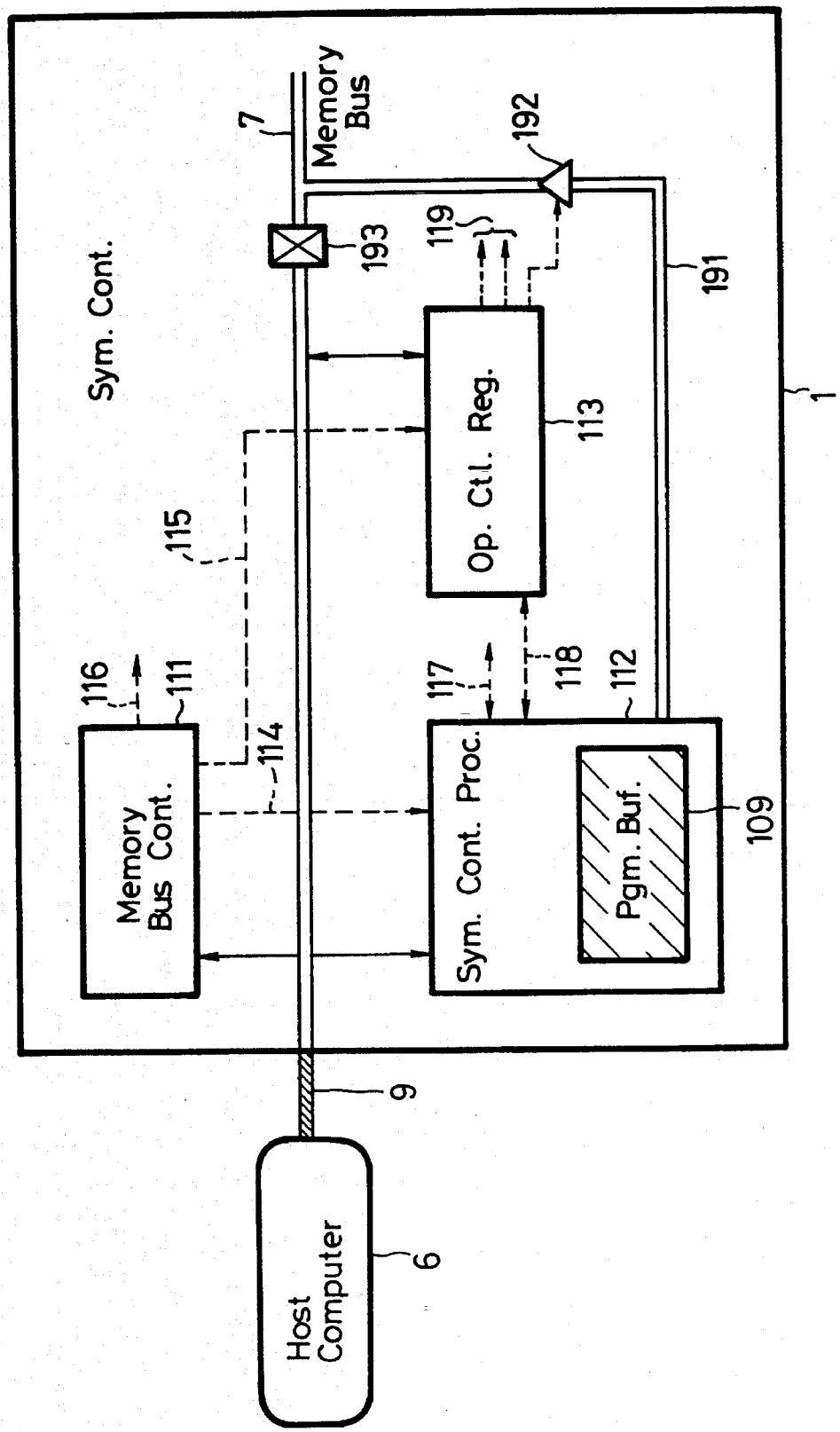
FIG. 7 is a block diagram of a system controller in the image processing system shown in FIG. 6.

FIG. 7 shows the system controller 1 in detail. In FIG. 7, the host computer 6 is connected to the memory bus 7 through the system bus 9. The system controller 1 comprises a memory bus controller 111, a system control processor 112, and an operation control register 113. The system control processor 112 has the program buffer memory 109 as a built-in memory.

The memory bus controller 111 serves to read data from the memory bus 7 and interpret the data, and also to supervise the memory bus 7 through control lines 114, 115, 116 so that a desired component can exchange data with the memory bus 7. Specifically, the control line 114 is used to load a program into the system control processor 112. The control line 115 is used to set control data in the operation control register 113 and to read a status signal indicative of a status in the image processing system. The control line 116 is used for the host computer 6 to access the work memory 4.

The system control processor 112 is able to operate when it is loaded with the program supplied from the host computer 6 through the memory bus 7. The program is first written in the program buffer memory 109, and then loaded into a program memory in the system control processor 112 by a loader thereof. The program is also loaded into a program memory in each of the data flow controller 2 and the processors of the processing unit 3 from the program buffer memory 109 through a program transfer line 191, a switch 192, and the memory bus 7 under the control of the system control processor 112. The switch 192 can be opened and closed under the control of the operation control register 113. When the switch 192 is open, a bus separator 193 is closed under the control of the operation control register 113.

The system control processor 112 communicates with the data flow controller 2 through a control line 117 for timing their processing, and also sets status data in the operation control register 113 through a control line 118 for informing the host computer 6 of the status of the data flow controller 2.

The operation control register 113 is supplied with system control data from the host computer 6 through the memory bus 7. The system control data is set by the control line 115. The system control data is transferred to various parts of the image processing system through a control line 119.

Figure 8:
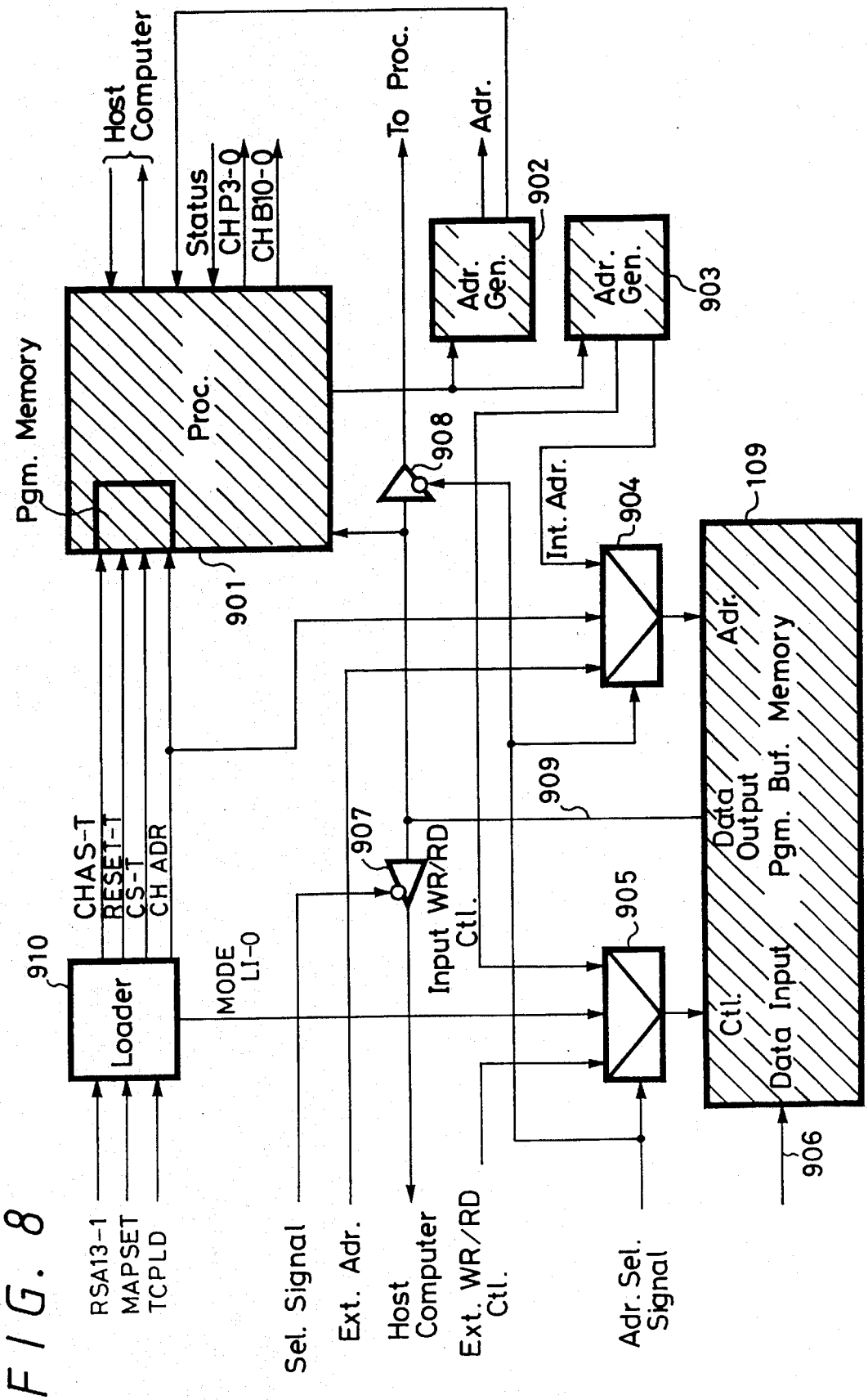
FIG. 8 is a block diagram of a system control processor in the image processing system shown in FIG. 6.

The system control processor 112 is shown in detail in FIG. 8. In FIG. 8, the system control processor 112 comprises a processor 901 for controlling the entire image processing system, a program buffer memory 109 for temporarily storing data and program transferred from the host computer 6, an address generator 902 for supplying addresses to the program memory of each of the processors in the system except for the processor 901, an address generator 903 for supplying addresses to the program buffer memory 109, and a loader 910 for transferring the program from the program buffer memory 109 to a program memory in the processor 901. The processor 901 controls the setting of parameters for defining an address generation range of the address generators 902, 903 and also the starting of the address generators 902, 903.

The processor 901 also serves to indicate processors in the system to which data and program are to be transferred. The host computer 6 communicates with the processor 901, informing that data will be transferred to the image processing system. An external address from the host computer 6 and an internal address from the address generator 903 are supplied to a selector 904. One of the external and internal addresses is selected by the selector 904 based on an address selection signal that is transmitted from the host computer 6 through the operation control register 113.

Likewise, an external write/read control signal from the host computer 6 and an internal write/read control signal from the address generator 903 are supplied to a selector 905. The selector 905 selects one of the external and internal write/read control signals based on an address selection signal that is transmitted from the host computer 6 through the operation control register 113. When the selectors 904, 905 select the external address and the external write/read control signal from the host computer 6, with the external write/read control signal indicating a write mode, data from the host computer 6 is written in the program buffer memory 109.

To load data and program from the program buffer memory 109 into each of the processors in the image processing system, the host computer 6 first communicates with the processor 901, indicating that the data is to be loaded into the processors. Then, the host computer 6 transmits an address selection signal through the operation control register 113 to enable the selectors 904, 905 to select the internal address and the internal write/read control signal from the address generator 903. When the internal address and the internal write/read control signal from the address generator 903 are selected, a tristate unit 908 is opened by the address selection signal.

According to the program stored in the program memory in the processor 901, the processor 901 indicates addresses in the program buffer memory 109, processors to which the addresses are to be transferred, and a sequence in which the addresses are to be transferred to the processors. The processor 901 supplies the address generators 902, 903 with parameters indicative of an address region in which to generate addresses, according to the program stored in the program memory in the processor 901. The processor 901 starts the address generators 902, 903 individually so that address and data will arrive simultaneously at a desired processor.

Desired data is read from the program buffer memory 109 by an address from the address generator 903, and transferred to each of the processors through a signal line 909 and the tristate unit 908. The address at which the data is to be written in the program memory of each processor is transferred from the address generator 902. The address generation by the address generators 902, 903 is monitored by the processor 901 using status signals supplied from the address generators 902, 903.

Generally, the program from the host computer 6 is only written in the program buffer memory 109. In this embodiment, the data which has been transferred from the host computer 6 can be read by the host computer in order to diagnose the program buffer memory 109 for proper operation.

More specifically, the external write/read control signal from the host computer 6 selects a read mode for reading data. The data thus read is transferred through the signal line 909 and a tristate unit 907 to the host computer 6. When data is to be read from the host computer 6, the tristate unit 907 is opened by a selection signal that is transmitted from the host computer 6 through the operation control register 113. The other tristate unit 908 is closed except when the address generator 903 is selected by an address selection signal.

The loader 910 for loading the program from the program buffer memory 109 into the program memory of the processor 901 will be described below. As shown in FIG. 8, the loader 910 is supplied from the host computer 6 with an execution address (also called map data) to be set in a map register in the processor, a set signal for setting an execution address, and a transfer start signal. The loader 910 supplies the selector 905 with a read/write signal, supplies the selector 904 with an address, and also supplies the processor 901 with a loader transfer address effective signal CHAST, a reset signal RESETT, a signal CST indicative of a program transfer mode, and an address signal CHADR. Before transferring the program from the program buffer memory 109 to each of the processors, the loader 910 transfers the program stored at a certain address in the program buffer memory 109 to a certain address in the program memory of the processor 901.

Figure 9:
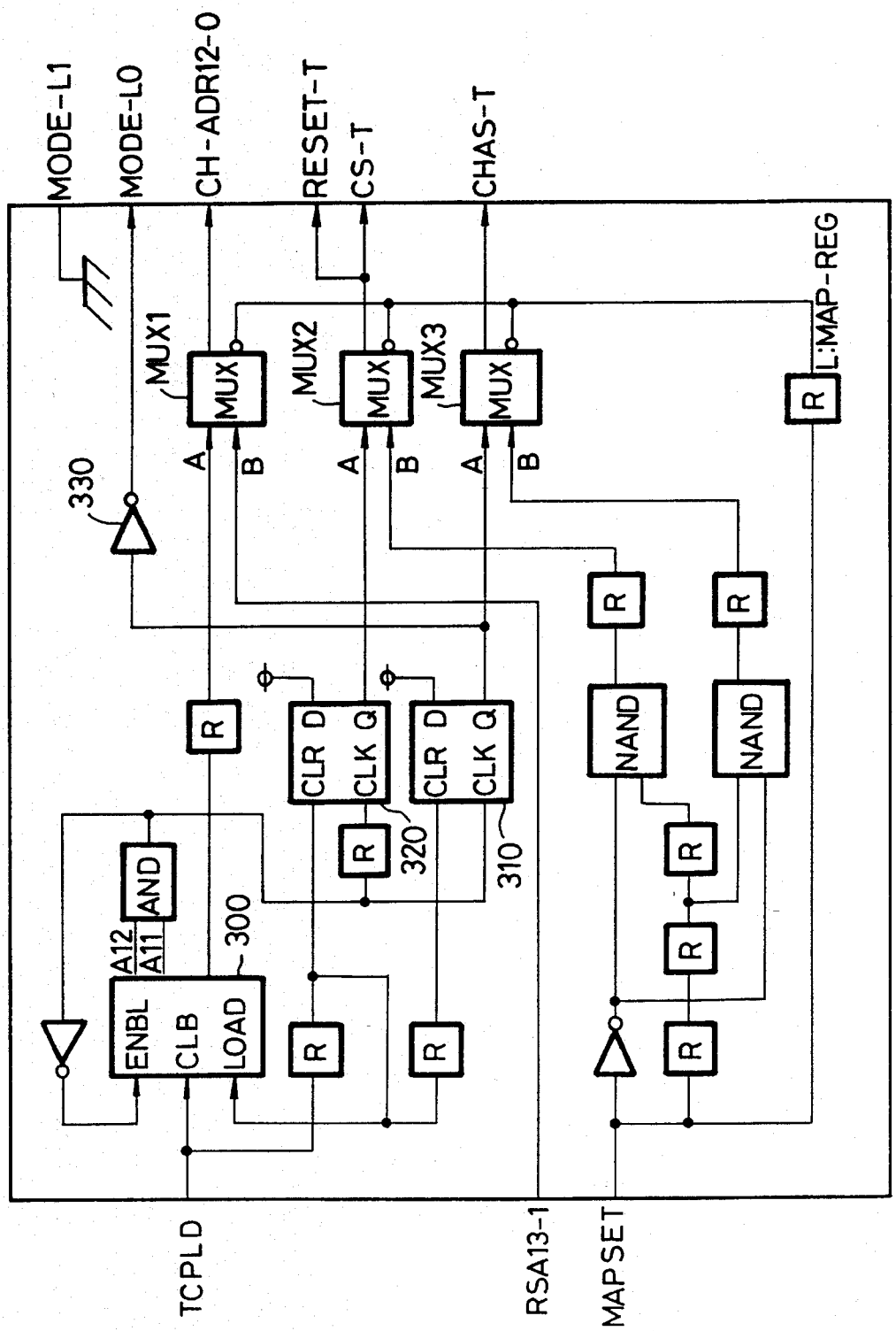
FIG. 9 is a block diagram of a loader in the image processing system shown in FIG. 6.

As shown in FIG. 9, the loader 910 comprises a counter 300 and flip-flops 310, 320, and has a generator for generating addresses and a transfer control signal, a generator for generating an execution address set signal, and a selector for selecting these signals.

The program is transferred from the host computer 6 to the program memory of the processor 901 as follows:

The selectors 905, 904 are supplied with an address selection signal so as to select a write/read signal and an address signal from the host computer 6. Program data is supplied to the program buffer memory 109 to transfer the program from the host computer 6 to the program buffer memory 109.

Then, an address selection signal is supplied to the selectors 905, 904 to cause the selectors 905,904 to supply a read/write signal and an address signal supplied from the loader 910 to the program buffer memory 109. The program written at the address supplied from the loader 910 is read, and loaded into the program memory of the processor 901 by the transfer operation of the loader 910. When the program is loaded into the program memory of the processor 901, the processor 901 is able to operate, and supplies parameters to the address generators 902, 903.

Figure 10:
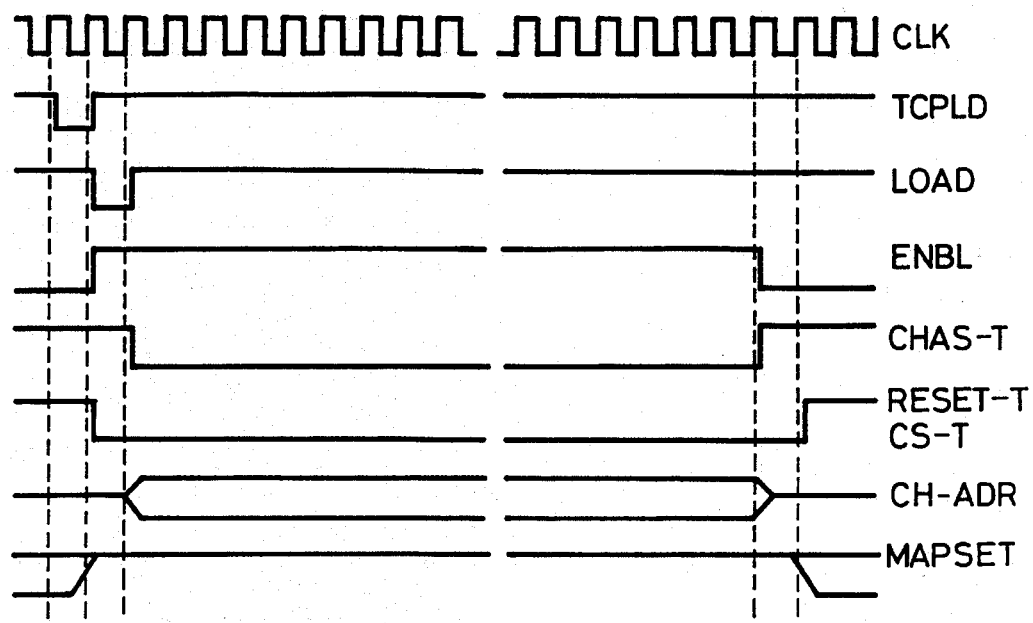
FIGS. 10 and 11 are timing charts of an operation sequence of the loader shown in FIG. 9.
Figure 11:
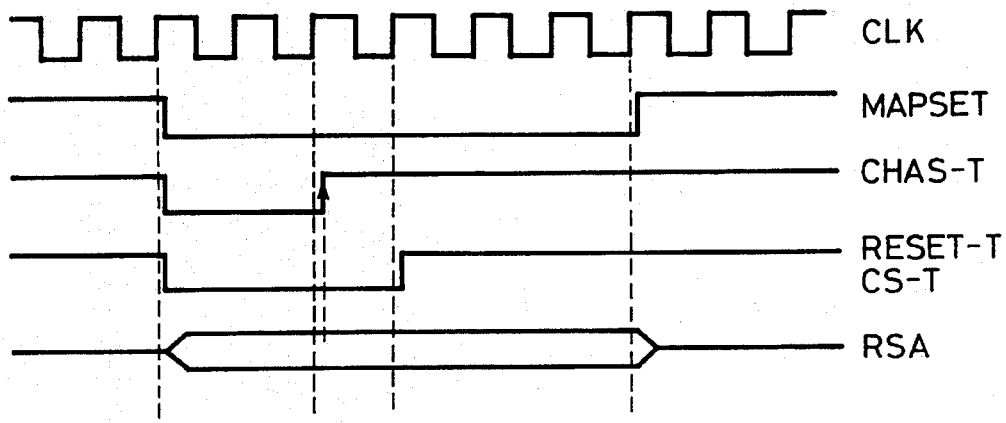

Operation of the loader 910 will be described below with reference to FIGS. 9, 10, and 11.

The set signal MAPSET for setting an execution address is rendered high to select the program transfer mode, enabling three selectors MUX1, MUX2, MUX3 to select an input signal A. Then, a transfer start signal TCPLD is applied to a clear terminal CLR of a counter 300, clearing the counter 300. The transfer start signal TCPLD is normally high, but is rendered low when starting the counter 300. When the transfer start signal TCPLD is low, an enable signal ENBL applied to the counter 300 is rendered high, readying the counter 300 for starting. When the transfer start signal TCPLD is high, the counter 300 starts its counting operation. In FIG. 9, when addresses from 0 address to 6143 address are generated, the enable signal ENBL goes low, and the counter 300 stops its counting operation.

The loader transfer address effective signal CHSAT goes low one clock after the enable signal ENBL goes high, and goes high when the enable signal ENBL goes low. The reset signal RESETT and the transfer mode signal CST which are supplied to the processor 901 go low when the enable signal ENBL goes high, and go high one clock after the enable signal ENBL goes low.

The MSB (MODEL 1) of a read/write signal MODE is unconditionally low because the loader never writes the program in the program buffer memory. The read/write signal is defined such that it is 01 when reading the program, 10 when writing the program, and 00 when doing nothing. The set signal MAPSET is rendered high to select the program transfer mode, causing the three selectors MUX1, MUX2, MUX3 to select the input signal A.

Then, a transfer start signal TCPLD is applied to the clear terminal CLR of the counter 300, clearing the counter 300, whereupon address signals are successively supplied through the selector MUX1 to the selector 904. The flip-flop 310 outputs a low-level signal that is inverted in level by an inverter 330, which outputs a high-level signal. The high-level signal is combined with the signal MODEL1 into a signal 01 which is supplied as a read signal MODEL1–0 to the selector 905.

Then, the set signal MAPSET is rendered low, causing the selectors MUX1, MUX2, MUX3 to select an input signal B. As shown in FIG. 11, the loader transfer address effective signal CHAST, the reset signal RESETT, and the transfer mode signal CST go low, and an execution address RSA is supplied as an address CHADR to the processor 910 at a positive-going edge of the loader transfer address effective signal CHAST. Based on these signals, the processor 910 stores the program supplied from the program buffer memory 109 at an address represented by the execution address RSA in the program memory.

When the program is thus loaded into the program memory of the processor 901, the processor 901 is able to operate, and supplies parameters to the address generators 902, 903, and the program is supplied from the program buffer memory 109 to each of the processors.

Immediately after starting to control the image processing system, a predetermined program stored in a ROM may be executed to read and load the program from the program buffer memory 109 into a RAM. After the program has been loaded into the RAM, the program memory of the processor is switched from the ROM to the RAM, and then the program is transferred from the program buffer to the other processors, and various control processes are executed according to the program stored in the program buffer.

In the above image processing system, the burden on the host computer 6 and the system controller 1 for the transfer of the program is reduced. The system controller 1 is not required to have a large-capacity ROM. The time required to transfer the program data from the host computer 6 is shortened. Accordingly, the total processing time of the image processing system is reduced.

FIGS. 12 through 18 show an image processing system according to still another embodiment of the present invention. Those parts shown in FIGS. 12 through 18 which are identical to those shown in FIGS. 1 through 11 are denoted by identical reference numerals, and will not be described in detail below.

Figure 12:
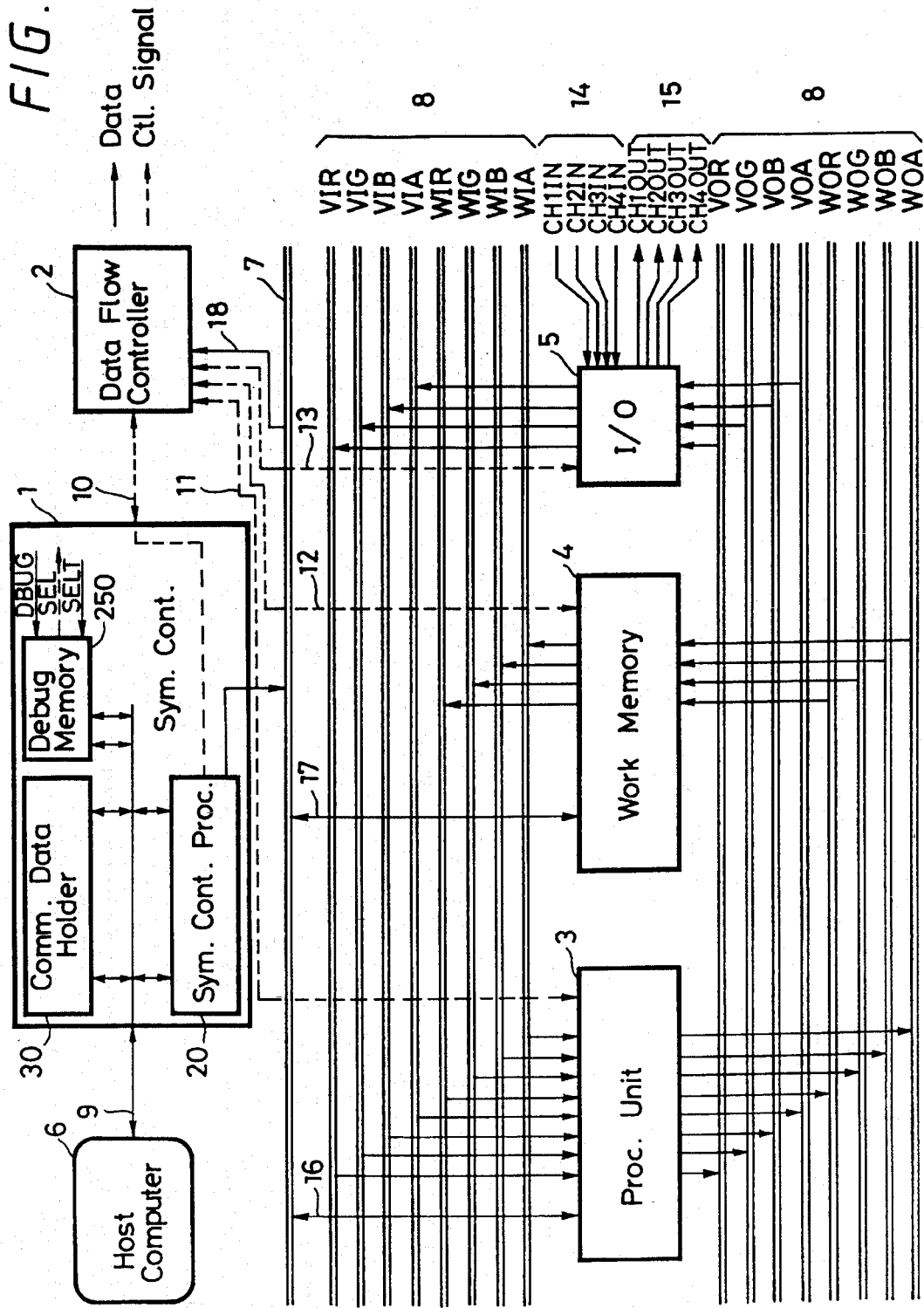

As shown in FIG. 12, a system controller 1 has a system control processor 20, a communication data holder 30, and a debug memory 250 for selectively retrieving debug data from the processors and supplying the retrieved debug data to the host computer 6.

The debug memory 250 will be described below in detail with reference to FIGS. 13 through 18.

Figure 13:
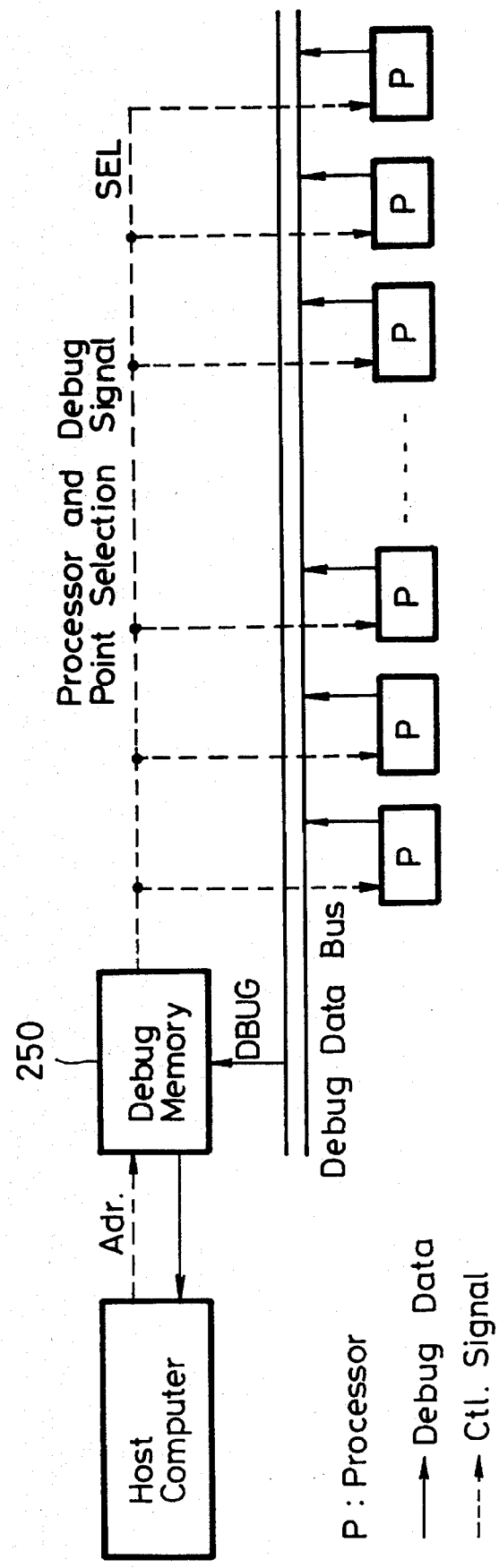
FIG. 13 is a block diagram illustrative of a debug data retrieval function of the image processing system shown in FIG. 12.

FIG. 13 schematically shows, in block form, a portion of the image processing system shown in FIG. 12, illustrating the relationship between the debug memory 250, the processors, and the host computer 6.

As shown in FIG. 13, the debug memory 250 is connected to the host computer 6 such that the debug memory 250 is supplied with an address signal from the host computer 6, and supplies debug data to the host computer 6. The debug memory 250 is arranged to transmit a selection signal SEL to one of the processors from which debug data is to be retrieved. In response to the selection signal SEL, the corresponding processor supplies debug data DBUG over a debug data bus (not shown in FIG. 12) to the debug memory 250. The debug data DBUG is supplied to a debug data input terminal of the debug memory 250 as shown in FIG. 12. The selection signal SEL is outputted from an output terminal SELT of the debug memory 250. The debug data DBUG is representative of a processed result in each of the processors.

Figure 14:
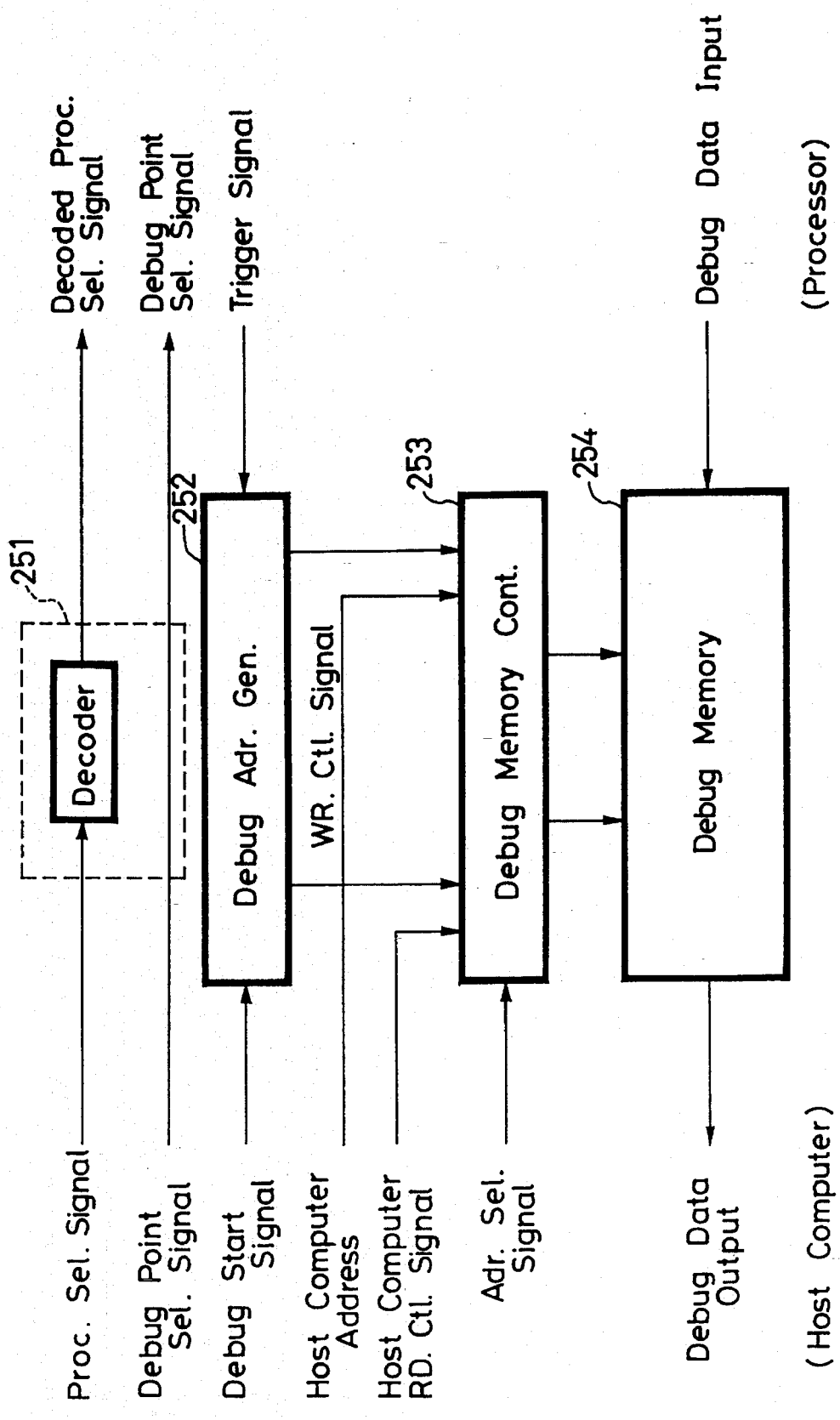
FIG. 14 is a block diagram of a debug memory in the image processing system shown in FIG. 12.

The debug memory 250 will be described below in detail with reference to FIG. 14.

The debug memory 250 has a debug selector 251 having a decoder for decoding a processor selection signal supplied from the host computer 6, the debug selector 251 supplying each processor with the decoded processor selection signal and a debug point selection signal indicating a position for reading debug data from the processor which is selected by the host computer 6. The debug memory 250 also has a debug address generator 252 for generating an address for retrieving debug data and a write signal based on a debug start signal supplied from the host computer 6 and on a trigger signal supplied from the processors, and a debug memory controller 253 for supplying a debug memory 254 selectively with an address and a read signal that are supplied from the host computer 6 or a write signal and an address that are supplied from the debug address generator 252. The debug memory unit 254 serves to store debug data supplied from the processors, and supply the stored debug data to the host computer 6. In this embodiment, the debug memory 254 comprises a memory having a storage capacity whose width corresponds to the sum of bits of the program counter address of the processors and one trigger bit, and whose depth corresponds to 2048 bits.

Figure 15:
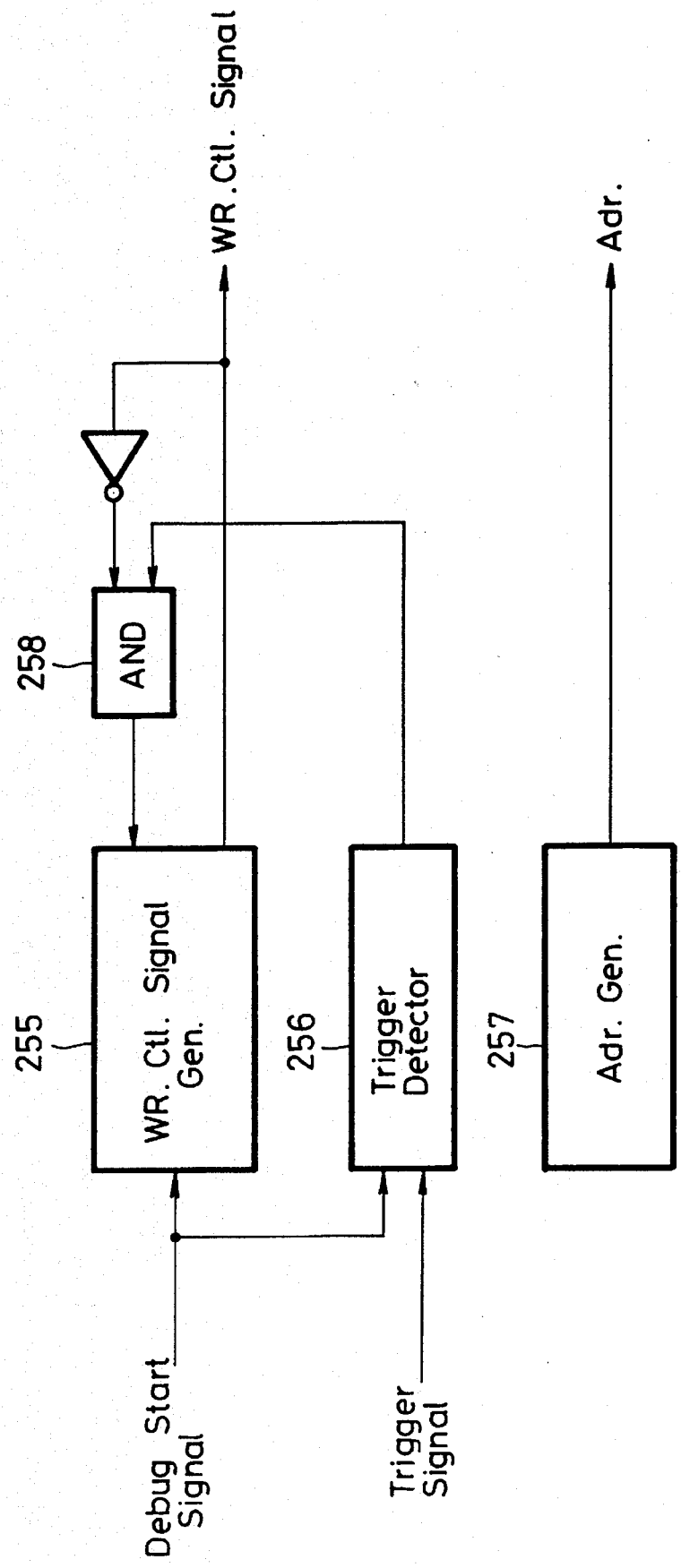
FIG. 15 is a block diagram of a debug address generator in the image processing system shown in FIG. 12.

The debug address generator 252 will be described below in detail with reference to FIG. 15.

The debug address generator 252 comprises a write control signal generator 255 for being supplied with the debug start signal from the host computer 6, a trigger detector 256 for being supplied with the debug start signal from the host computer 6 and the trigger signal from the processors, an AND gate 258 for ANDing a signal which is an inversion of a write control signal outputted from the write control signal generator 255 and an output signal from the trigger detector 256, and for applying the ANDed signal as a control signal to the write control signal generator 255, and an address generator 257 for generating an address signal.

The debug memory 250 operates as follows:

The host computer 6 supplies a processor selection signal to select a processor from which debug data is to be retrieved, and a debug point selection signal to select a debug point in the processor. The host computer 6 also supplies an address selection signal to the debug memory controller 253 to enable the latter to supply a signal corresponding to the address selection signal to the debug memory 254.

Then, the host computer 6 supplies a debug start signal to the debug address generator 252 to cause the latter to start generating a write control signal.

An operation sequence of the debug address generator 252 is shown in FIG. 16. The address generator 257 of the debug address generator 252 outputs addresses at all times.

In response to the debug start signal applied to the debug address generator 252, debug data starts and continues to be written in the debug memory 254. The writing of the debug data is stopped 1024 clock pulses after a trigger signal is supplied from the processor. As a result, 2048 sample data, including those written in response to 1024 clock pulses prior to the trigger signal, are written in the debug memory 254.

A debug data bit structure of the debug memory 254 is shown in FIG. 17. As shown in FIG. 17, the debug data bit structure of the debug memory 254 comprises an area for storing a program counter address, an area for storing debug data, and an area for storing a trigger signal.

The debug data written in the debug memory 254 is read based on an address signal from the host computer 6, which is selected by the debug memory controller 253 based on an address selection signal, and a read control signal from the host computer 6, and is supplied to the host computer 6. The debug data is then used to debug the program by the host computer 6.

Figure 18:
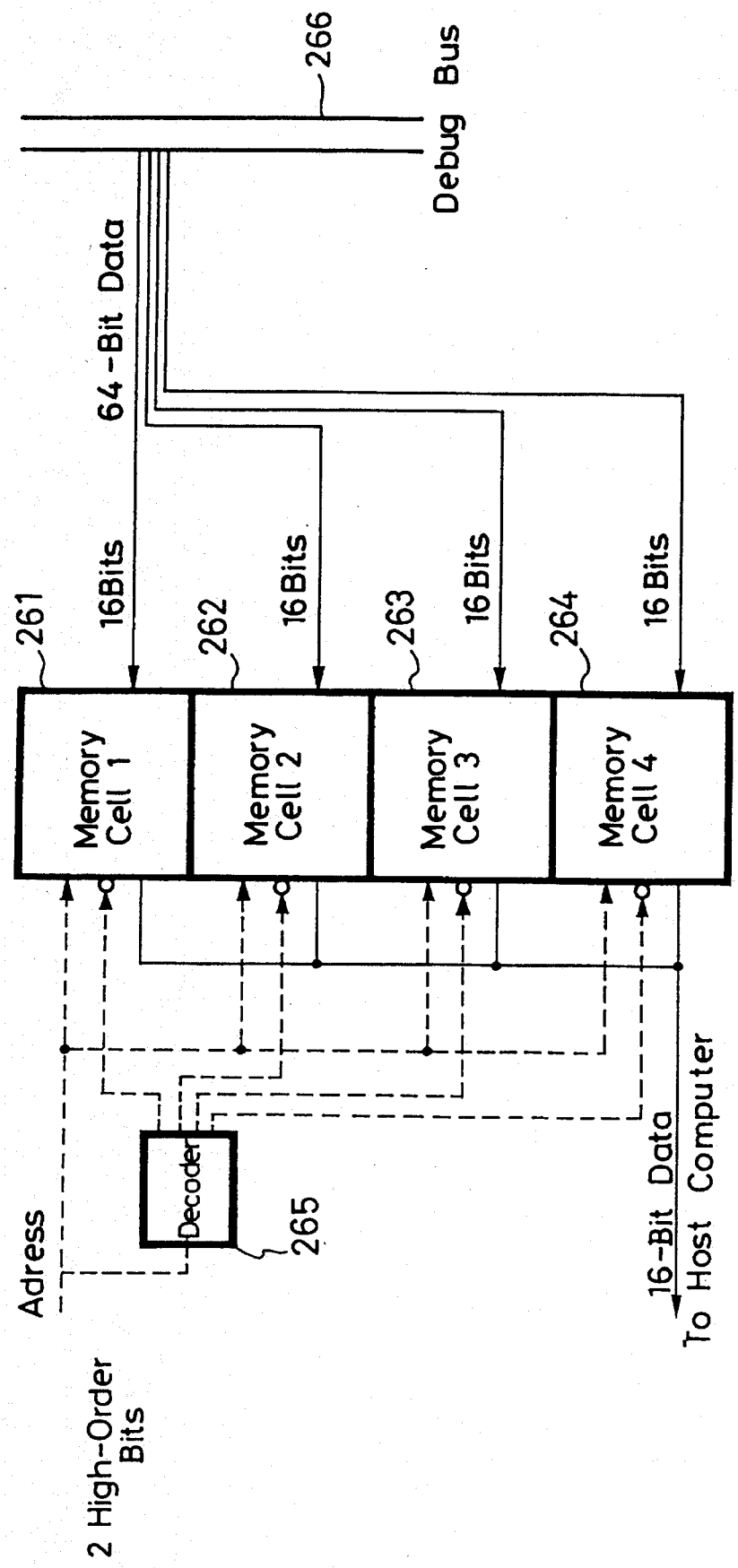
FIG. 18 is a block diagram of memory cells of the debug memory shown in FIG. 14.

The debug memory 254 will be described below in detail with reference to FIG. 18.

For the sake of brevity, it is assumed that debug data is of 64 bits and transfer data of 16 bits. The debug memory 254 comprises four memory cells 261, 262, 263, 264, which may be memory banks. Each of the memory cells is selected by a cell selection signal generated by a decoder 265 serving as a cell selector. The decoder 265 is supplied with 2 high-order bits of an address and a read/write signal. In a write mode, the decoder 265 produces a signal for selecting all the memory cells 261, 262, 263, 264. In a read mode, the decoder 265 decodes the address and produces a signal for selecting one of the memory cells 261, 262, 263, 264. When debug data is written in the debug memory 254, 64-bit debug data is written simultaneously in the memory cells 261, 262, 263, 264, 16 bits per memory cell. When debug data is read from the debug memory 254, 16-bit debug data is read successively from the memory cells each indicated by the 2 high-order bits of an address.

A debug data bus 266 will be described below. The debug data bus 266 has the same bit width as the debug memory 254, and a transfer rate which is the same as the debug data output rate of the processor. The transfer of debug data to the debug data bus 266 is controlled by the processor selection signal and the debug point selection signal which are supplied from the host computer 6. Debug data is supplied to the debug data bus 266 only from a selected one of the processors.

The debug memory 254 may comprise a plurality of memories associated respectively with the processors, and debug data from all the processors may be retrieved at the same time in response to a trigger signal from the processor that is indicated by the host computer 6. The host computer 6 can read debug data from a desired processor by indicating an address. While such a modification is advantageous in that a lot of debug information can be retrieved in one execution, the hardware arrangement required is slightly larger.

In this embodiment, since the host computer can easily recognize the processing status of each of the processors, it can easily locate a program bug, and can generate a large-scale program with high efficiency.

As the host computer can recognize the operation of each of the processors, the host computer can provide a diagnostic function for each processor.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An image processing system comprising:

processing means for processing image data based on processing information supplied from a host computer and which includes a plurality of simultaneously operable processors and a work memory; and a controller for the processing system including storage means apart from said processing means which includes said processors and said work memory and also apart from said host computer for storing the processing information supplied from the host computer at respective addresses indicated by the host computer, control means for supplying the processing information read from said storage means to said processing means apart therefrom, means for holding the stored processing information at said respective addresses until new processing information is supplied from the host computer, and means for supplying the stored processing information to said host computer from said respective addresses of the storage means which is apart from said processing means in response to a read signal and respective address signals supplied from said host computer.

2. An image processing system according to claim 1; further comprising means for producing final processed data representative of a combination of processed data from said processors; and wherein said storage means includes means for storing data indicative of the processed data from one of the processors which is indicated by a selection signal supplied by the host computer, and said control means includes means for reading the stored data indicative of processed data from said storage means and supplying the read data to the host computer in response to a read signal supplied from the host computer.

3. An image processing system according to claim 2; wherein said host computer retrieves the data indicative of the processed data and which are supplied from said storage means by said control means as debug data for debugging said processing information.

4. An image processing system comprising:

processing means including a plurality of simultaneously operable processors and a work memory for processing image data by execution thereon of a sequence of processes based on processing information supplied from a host computer and for providing data indicative of the status of said execution; and a controller for the processing system including storage means apart from said processing means and said host computer for storing the processing information supplied from the host computer at respective addresses indicated by the host computer, said storage means including communication data holding means comprised of a plurality of control registers for holding data representing said processing information from the host computer and a plurality of status registers for holding said data indicative of the status of the execution in said processing means, control means for supplying the processing information read from said storage means to said processing means apart therefrom, means for holding the stored processing information at said respective addresses until new processing information is supplied from the host computer, and means for supplying the stored processing information from said respective addresses of the storage means to said host computer in response to a read signal and respective address signals supplied from said host computer.

5. An image processing system according to claim 4; wherein said storage means further includes a buffer storage memory.

6. An image processing system comprising:

processing means for processing image data based on processing information supplied from a host computer and which includes a plurality of simultaneously operable ,processors and a work memory; and a controller for the processing system including storage means apart from said processing means and said host computer for storing the processing information supplied from the host computer at respective addresses indicated by the host computer, said storage means including a program buffer memory for storing said processing information supplied from said host computer, control means for supplying the processing information read from said storage means to said processing means apart therefrom, said control means including a system control processor for supplying the processing information stored in said program buffer memory selectively to said processors, a program memory in said system control processor for storing an operation program for said system control processor, a loader for loading said program memory with said operation program from said program buffer memory in response to an address signal and a transfer start signal supplied from said host computer and means in said system control processor for supplying a processing program from said program buffer memory selectively to said processors of said processing means in accordance with said operation program loaded in said program memory, means for holding the stored processing information at said respective addresses until new processing information is supplied from the host computer, and means for supplying the stored processing information from said respective addresses of the storage means to said host computer in response to a read signal and respective address signals supplied from said host computer.

7. An image processing system comprising:

processing means for processing image data based on processing information supplied from a host computer and which includes a plurality of simultaneously operable processors and a work memory;

means for producing final processed data representative of a combination of processed data from said processors; and a controller for the processing system including storage means apart from said processing means and said host computer for storing the processing information supplied from the host computer at respective addresses indicated by the host computer, said storage means including means for storing data indicative of the processed data from one of the processors which is indicated by a selection signal supplied by the host computer, said means for storing data indicative of the processed data including a plurality of memory cells in which data indicative of the processed data are written simultaneously and from which the data written in said memory cells are read in succession in response to a read signal from the host computer, control means for supplying the processing information read from said storage means to said processing means apart therefrom, said control means including means for reading the stored data indicative of processed data from said storage means and supplying the read data to the host computer in response to a read signal supplied from the host computer, said host computer retrieving the data indicative of the processed data and which are supplied from said storage means by said control means as debug data for debugging said processing information, means for holding the stored processing information at said respective addresses until new processing information is supplied from the host computer, and means for supplying the stored processing information from said respective addresses of the storage means to said host computer in response to a read signal and respective address signals supplied from said host computer.

* * * * *